(12) United States Patent  
Ishihara

(10) Patent No.: US 6,517,244 B2
(45) Date of Patent: Feb. 11, 2003

(54) LINEAR MOTION GUIDE UNIT

(75) Inventor: Toyohisa Ishihara, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 58 days.

(21) Appl. No.: 09/729,795

(22) Filed: Dec. 6, 2000

(65) Prior Publication Data

US 2002/0039458 A1 Apr. 4, 2002

(30) Foreign Application Priority Data

Dec. 28, 1999 (JP) .......................................... 11-373043

(51) Int. Cl.$^7$ ............................................... F16C 29/06
(52) U.S. Cl. ........................................... 384/13; 384/45
(58) Field of Search .............................. 384/13, 45, 43, 384/44

(56) References Cited

U.S. PATENT DOCUMENTS

| 5,492,413 | A |   | 2/1996  | Tsukada |
| 5,967,667 | A |   | 10/1999 | Takakashi |
| 6,082,899 | A | * | 7/2000  | Suzuki et al. ................. 384/13 |
| 6,176,617 | B1| * | 1/2001  | Kamimura et al. ........... 384/13 |

FOREIGN PATENT DOCUMENTS

| EP | 0 874 172 A1 | 10/1998 |
| EP | 0 902 201 A2 | 3/1999 |
| EP | 0 905 395 A1 | 3/1999 |
| JP | 93952/1999   | 6/1999  |

OTHER PUBLICATIONS

Patent Abstracts for Japan, English language abstract of JP 09 126235, published May 13, 1997, to Nippon Seiko KK.
Patent Abstracts of Japan,, English language abstract of JP 11 251251, published Dec. 24, 1999, to Nippon Thompson Co., Ltd.

* cited by examiner

Primary Examiner—Lenard A. Footland
(74) Attorney, Agent, or Firm—Browdy and Neimark

(57) ABSTRACT

A linear motion guide unit is disclosed in which a lubricant-impregnated plate is mounted on any one side thereof with a backing plate and accommodated in a cartridge. The lubricant-impregnated plate is less subject to deformation or distortion, thus continuing to keep precisely the sliding relation with the raceway grooves on the track rail. Lubricating means are arranged on end caps of the slider, one on each end cap. The lubricating means is composed of a lubricant-impregnated plate of sintered resinous component, a backing plate high in stiffness attached to the lubricant-impregnated plate into a composite plate, and a cartridge accommodating therein the composite plate. The backing plate and cartridge, in combination, sustain squeezing load caused when the lubricating means is fastened to the slider. Thus, the lubricant-impregnated plate is free from the squeezing load, keeping precise sliding-contact relation with the raceway grooves on the track rail.

8 Claims, 11 Drawing Sheets

LINEAR MOTION GUIDE UNIT

BACKGROUND OF THE INVENTION

1. Field of the Invention

The present invention relates to a linear motion guide unit comprised of an elongated track rail and a slider installed onto the track rail for linear movement relative to the track rail and, more particularly, to a linear motion guide unit with lubricating means to apply lubricant to the track rail as the slider traverses the rail.

2. Description of the Prior Art

The linear motion guide units have been conventionally used incorporated in the parts or components for reciprocating motion in fields as diverse as the industrial robots, semiconductor manufacturing machines, inspection instruments, machine tools or the like to satisfy the demands for higher accuracy, high-speed, miniaturization and so on. The recently remarkable development in mechatronics technology extensively requires linear motion guide units that may meet with needs of maintenance-free, especially, the self-lubrication of long service life on its relatively movable sliding areas, along with miniaturization, higher accuracy and high-speed in operation.

FIGS. 17 to 19 in the accompanying drawings show a prior linear motion guide unit disclosed in, for example, Japanese Patent Laid-Open No. 93952/1999. The prior linear motion guide unit is primarily comprised of a track rail 2 and a carriage or slider 1 riding the track rail 2 astride for sliding movement. The track rail 2 is formed in a substantially rectangular shape in cross section, which are recessed on lengthwise side surfaces 3 thereof to provide raceway grooves 4. The slider 1 may move on the track rail 2 by virtue of rolling elements running through the raceway groove 4. The slider 1 includes a casing 5 recessed so as to fit over the track rail 2 for sliding movement with respect to the track rail 2, and end caps 6 mounted to forward and aft ends of the casing 5, one to each end.

The casing 5 is made with raceway grooves 9 in opposition to the raceway grooves 4 on the track rail 2 to allow rolling elements 7 to run through between the confronting raceway grooves 4 and 9. Retainer bands 18 are provided in the casing 5 so as to embrace the rolling elements 7 to thereby prevent the rolling elements 7 from falling out of the casing 5. Bottom seals 8 are attached to the lower surfaces of the casing 5 and the end caps 6 to close clearances between the track rail 2 and the combined casing 5 and end caps 6. The rolling elements 7 run through load areas of raceways defined between the raceway grooves 4 on the track rail 2 and the raceway grooves 9 in the casing 5, then turnarounds formed in the end caps 6 and return passages 12 formed in parallel with the raceway grooves 9 in the casing 5. It will be thus understood that the rolling elements 7 are allowed to run through recirculating passages, each of which consists of the load area of the raceway defined between the confronting raceway grooves 4 and 9, and non-loaded area 22 composed of the turnarounds and return passages 12. The slider 1 is allowed to move in a sliding manner along the track rail 2 by virtue of the rolling elements 7 that roll through the load areas between the confronting raceway grooves 4 and 9.

Lubricating means 15 are fastened to end faces 16 of the forward and aft end caps 6, one to each end cap, so as to ride the track rail 2 astride. The lubricating means 15 are each comprised of a lubricant-impregnated plate 40 coming in sliding contact with the track rail 2, and a backing cartridge 21 to support the lubricant-impregnated plate 40 therein. Each lubricating means 15 is made in a platy configuration of uniform thickness and recessed in conformity with the cross section of the casing 5 so as to fit over and conform to the track rail 2 for sliding movement. The backing cartridge 21 has the contour substantially resembling a gate as a whole, which is composed of a ceiling section 28, a pair of side sections 29, 29 extending downward from the sidewise opposing ends of the ceiling section 28, and lower sections 30, 30 extending towards each other from the bottom ends of the side sections 29, 29.

Each lubricating means 15 may fit over the track rail 2 with its ceiling section 28 lying in parallel with a top surface 14 of the track rail 2, the side sections 29, 29 depending downwards in parallel with the lengthwise side surfaces 3 of the track rail 2, and its lower sections 30, 30 extending towards the lengthwise side surfaces 3 of the track rail 2. Thus, the backing cartridge 21 holds in place the lubricant-impregnated plate 40 by surrounding around the periphery of the lubricant-impregnated plate 40, except areas facing the track rail 2. The lubricant-impregnated plate 40 is uncovered at its fore-and-aft major surfaces: forward and aft end surfaces facing against the end caps 6 and end seals 17 respectively. Thus, the lubricant-impregnated plate 40 is left exposed at its major end surfaces until covered with its associated end cap 6 and end seal 17 on the slider 1. The backing cartridge 21 conceals the periphery of the lubricant-impregnated plate 40 to seal pores in the porous structure, protecting the lubricant-impregnated plate 40 against contamination, breakage and escape of lubricant.

The backing cartridge 21, although may be made of any one of metals, synthetic resins, synthetic rubbers and so on, is invariably made of any substance that may be much subject to either elastic deformation or plastic deformation restorable later in order to provide an easy to replace or handle the lubricating means 15. Where the lubricant-impregnated plate 40 is fitted in the backing cartridge 21, or only the lubricating means 15 is either mounted to or dismounted from the track rail 2 with all the casing 5, end caps 6 and end seals 17 left on the track rail 25, the backing cartridge 21 that may be easily subject to either plastic or elastic deformation without occurring breakage makes it possible to simply fit the lubricant-impregnated plate 40 into the backing cartridge 21 or mount the lubricating means 15 on the track rail 2.

The lubricating means 15 will be attached to the casing 5 with the backing cartridge 21 being urged against the end faces of the end caps 6 fastened on the forward and aft ends of the casing 5, thence the backing cartridge 21 is reinforced at its four corners 22 where holes 24 are made for fastening bolts 25. The end caps 6 and end seals 17 sandwiching the backing cartridge 21 between them are also made with matching holes 26, 27 for the fastening bolts in alignment with the holes 24 in the backing cartridge 21. Thus, the backing cartridge 21, together with the associated end cap 6 and end seal 17 keeping the backing cartridge 21 between them, is held on the slider 1 with the fastening bolts 25, which are stretched through the holes 26, 24 and 27 in the end cap 6, backing cartridge 21 and end seal 17, and ultimately screwed into holes in the casing 5 of the slider 1. With the backing cartridge 21 made of synthetic resin or synthetic rubber, collars 23 fit in holes 24 in such a manner that the collars 23 mostly sustain the squeezing force applied by the fastening bolts 25, which are inserted through the collars 23 and tightened, to thereby protect the backing cartridge 21 against the deformation or distortion that might otherwise happen due to the compressive force when tightened.

The lubricant-impregnated plate 40, as shown in FIG. 19, is divided into lubricant-impregnated halves 41, 41, which are arranged on opposite sides of the track rail 2 so as to separately come in sliding contact with their associated raceway grooves 4 on the track rail 2. The lubricant-impregnated halves 41, 41, assembled in the backing cartridge 21, are arranged spaced apart from one another with a middle area 33 in the backing cartridge 21. Upon assemblage of the lubricating means 15, the lubricant-impregnated halves 41, 41 are separately accommodated in the backing cartridge 21, which is then fastened to the casing 5 in such a relation that the halves 41, 41 are arranged confronting the track rail 2. The backing cartridge 21 surrounding the lubricant-impregnated halves 41, 41 helps hold steadily them in place. Moreover, the backing cartridge 21 as stated earlier serves to cover the lubricant-impregnated halves 41, 41 against contamination and breakage as well as prevent the escape of lubricant. Each of the lubricant-impregnated halves 41, 41 is allowed to provide only as much volume as needed to lubricate the raceway grooves 4 and, therefore, the lubricant-impregnated plate 40 may be made more compact in size.

The lubricant-impregnated halves 41, 41 are arranged in symmetry on the opposite sides of the track rail 2. Accommodating the lubricant-impregnated plate 40 in the backing cartridge 21, therefore, may be completed by putting merely mass-produced lubricant-impregnated halves 41, 41 of the same pattern in the backing cartridge 21 in such a fashion as to invert any one to the other with respect to the line A—A in FIG. 19. This makes it possible to use any mould of the same pattern to produce the lubricant-impregnated halves 41, 41, resulting in the reduction in manufacturing cost of the lubricating means 45. The backing cartridge 21 is made at the ceiling section 28 thereof with a middle area 33 extending towards a top surface 14 of the track rail 2. Thence, the lubricant-impregnated halves 41, 41, accommodated in the backing cartridge 21, are held in such a relation that they are isolated from each other and confined by the upper section 28 with the middle area 33, side sections 29, 29 and lower sections 30, 30. That is to say, the lubricant-impregnated halves 41, 41 are exposed to their confronting raceway grooves 4 on the track rail 2 at only the areas where none of the sections stated earlier exists.

Windows 31, 32 are provided at the upper section 28 and the side sections 29, 29 of the lubricating means 15 to offer much saving in material for producing the backing cartridge 21 and also to make easy of the access to the lubricant-impregnated plate 40. For example, the windows 31, 32 allow monitoring visually the lubricant-impregnated plate 40. Moreover, after consumption of the lubricant, the lubricant-impregnated plate 40 short of lubricant may be supplied with the lubricant through the windows 31, 32. The lubricant-impregnated halves 41, 41 have raised surfaces 42, 43, each of which has a height about half the depth of the associated window 31, 32 so as to make positive engagement with the windows 31, 32. Engaging the raised surfaces 42, 43 with the windows 31, 32 may be carried out with the elastic deformation of either both or any one of the lubricant-impregnated halves 41, 41 and backing cartridge 21, for example, by sidewise stretching somewhat the backing cartridge 21 or compressing the lubricant-impregnated halves 41, 41. Engagement of the raised surfaces 42, 43 in the windows 31, 32 assures reliable fit of the lubricant-impregnated halves 41, 41 inside the backing cartridge 21, helping keep the lubricant-impregnated halves 41, 41 against falling off from the backing cartridge 21, which might otherwise happen before attaching on the slider 1 or after detaching from the slider 1.

The lubricant-impregnated plate 40 is composed of a sintered resinous component of porous structure including continuous voids therein, which are impregnated with lubricating oil. The sintered resinous component for the lubricant-impregnated plate 40 is fabricated by pressing fine powder of synthetic resins in a mould under high temperature. The lubricant-impregnated plate 40 is provided on the inside periphery thereof with convexities 44, which are raised inwardly so as to come in sliding contact with the raceway grooves 4 on the track rail 2 to continually supply the lubricant or lubricating oil from the lubricant-impregnated plate to the raceway grooves 4. Molded product for the lubricant-impregnated plate 40 is any sintered resinous porous component with open cells, which may be produced by filling a preselected mould with the powdery ultrahigh molecular weight polyethylene resin better in bonding with metals and having the grading of, for example, either fine grain size of 30 $\mu$m or coarse grain size of from 250 $\mu$m to 300 $\mu$m, and then heating the molded resin under high pressure. The sintered resinous component produced as described above for the lubricant-impregnated plate 40 has the porous structure of the porosity of, for example, from 40% to 50%.

The lubricant-impregnated plate 40 is prepared by immersing the sintered porous resinous component with lubricant of turbine oil to fill the voids with the lubricant. Dipping the sintered resinous component into, for example, turbine oil for about 30 minutes may provides the lubricant-impregnated plate 40 that is regulated at percentage of lubricating oil content of 41% by weight and thus at oil content of about 2 cc. Percentage of lubricating oil content may be controlled in accordance with the operating condition of the slider 1. The sintered resinous component for the lubricant-impregnated plate 40 may be easily formed with high accuracy of finishing within, for example, about ±0.025 mm. This makes it possible to provide the component that is most suitable for the linear motion guide units incorporated into the precision machines.

In the linear motion guide unit equipped with the lubricating means constructed as stated earlier, lubrication of the raceway grooves on the track rail may be effected with the lubricant that is applied from the lubricant-impregnated plate with no external force pressing the plate against the raceway grooves. This makes it possible to reduce frictional resistance that might otherwise much causes from the sliding movement of the lubricant-impregnated plate relative to the raceway grooves, whereby the lubricant-impregnated plate may be less subject to wear owing to relative sliding movement between the lubricant-impregnated plate and the track rail.

In the prior linear motion guide unit as described above, a pair of lubricant-impregnated halves for the lubricant-impregnated plate fits in the backing cartridge by making engagement with the windows at their upper and side peripheral areas. Nevertheless, the end face formed integrally with the backing cartridge, even when abutted against any one of forward and aft surfaces of the lubricant-impregnated halves, supports the lubricant-impregnated halves at their but any one side of the forward and aft surfaces. In current art, therefore, the lubricant-impregnated halves sometimes are not supported successfully. To cope with this, it will be expected to support the lubricant-impregnated plate at both sides of their forward and aft surfaces, thereby making even less the frictional resistance that occurs between the lubricant-impregnated plate and the associated raceway groove when the slider moves over the track rail, keeping the sliding movement of the lubricant-impregnated plate even smoother and more stable, and eventually making even less the wear of the lubricant-impregnated plate, which might be owing to the sliding movement.

SUMMARY OF THE INVENTION

The present invention has for its primary object to overcome the problems as described just above, especially provide a linear motion guide unit in which lubricating means is disposed between an end cap and an end seal, the lubricating means being comprised of a cartridge, a lubricant-impregnated plate accommodated in the cartridge, and a backing plate reinforcing the lubricant-impregnated plate, whereby the lubricating means reduces frictional resistance encountered when a slider moves over a track rail, helping ensure smooth reciprocating movement of the slider relatively of the track rail, and much decreasing deformation, wear and clogging, and so on in the lubricant-impregnated plate.

The present invention is concerned with a linear motion guide unit comprising; a track rail provided lengthwise with first raceway grooves and a slider movable with respect to the track rail; the slider being composed of a casing made with second raceway grooves confronting the first raceway grooves and return passages, rolling elements running through load areas formed between the confronting first and second raceway grooves, end caps fastened to end faces of the casing, one to each end face, and provided therein with turnarounds connecting the load areas and the return passages to form recirculating passages where the rolling elements are allowed to run through in an endless manner, lubricating means arranged on end faces of the end caps, one to each end cap, to lubricate the first raceway grooves formed on the track rail, and end seals disposed over the lubricating means; wherein the lubricating means is comprised of a lubricant-impregnated plate made of a sintered resinous component of porous structure impregnated with lubricant, a backing plate attached to any one of opposing major surfaces of the lubricant-impregnated plate to support the lubricant-impregnated plate, and a cartridge enclosing another exposed major surface and periphery of the lubricant-impregnated plate to accommodating therein the lubricant-impregnated plate.

In accordance with one aspect of the present invention, a linear motion guide unit is disclosed, wherein a lubricant-impregnated plate is reinforced or supported with a backing plate attached to the lubricant-impregnated plate to form a composite plate, which is then assembled with a cartridge in such a manner that the lubricant-impregnated plate in the cartridge is lidded with the backing plate. The lubricant-impregnated plate is held or supported on both the opposite sides thereof with the backing plate and the cartridge, respectively, thus kept against deformation or distortion that might otherwise happen due to any external force. As a result, the lubricant-impregnated plate is not urged excessively against the raceway grooves on the track rail, nor are they spaced apart largely away from the raceway grooves. This makes it possible to continue keeping the lubricant-impregnated plate in substantial contact relation with the raceway grooves to incessantly apply a desired amount of lubricant to the raceway grooves. With the slider moving relatively to the track rail, the sliding movement of the lubricant-impregnated plate over the track rail is made even smoother and more stable, so that the frictional resistance that occurs between the lubricant-impregnated plate and the associated raceway groove decreases and, thus, the lubricant-impregnated plate is less subject to wear, which might be owing to the sliding movement.

In accordance with another aspect of the present invention, a linear motion guide unit is disclosed, wherein the lubricant-impregnated plate includes a major portion contained in the cartridge to store the lubricant therein, and a minor portion formed integrally with the major portion and allowed to come in sliding contact with any associated raceway groove formed on the track rail to apply the lubricant stored in the major portion onto the associated raceway groove. In addition, the cartridge is provided therein with a window to allow the minor portion to protrude out of the cartridge. The lubricant-impregnated plate, although enclosed with the cartridge to be held certainly in precise geometry, has a portion raised from the major potion thereof, which protrude outwardly through the window formed in the cartridge, coming in sliding contact with the raceway grooves on the track rail.

In accordance with another aspect of the present invention, a linear motion guide unit is disclosed, wherein the lubricating means is disposed between the end seal and the end cap, and fastened to the casing together with the end seal and end cap by means of bolts, and wherein fastening stress caused when the bolt is fastened down is sustained by both the backing plate and the cartridge so that the lubricant-impregnated plate is free of the fastening stress. The fastening load due to bolts to clamp together the lubricating means and end seals is sustained directly by only both the backing plate and the cartridge and, therefore, the lubricant-impregnated plate is kept against the deformation or distortion that might otherwise happen owing to the fastening load caused by the bolt.

In accordance with a further aspect of the present invention, a linear motion guide unit is disclosed, wherein the cartridge is provided with a collar in which the bolt fits for fastening, and wherein the collar comes in abutment against the backing plate at an area where the bolt extends for fastening, thereby transmit the fastening stress to the backing plate. Thus, the fastening stress caused when tightening the bolt to assemble the lubricating means to the casing is transmitted through the collar nearby around the bolt so that the lubricant-impregnated plate, as free of the fastening load, is protected effectively against the deformation or distortion.

In accordance with another aspect of the present invention, a linear motion guide unit is disclosed, wherein the backing plate is provided with a piercing claw, and wherein the lubricant-impregnated plate is mounted to the backing plate by piercing the lubricant-impregnated plate with the claw.

In accordance with another aspect of the present invention, a linear motion guide unit is disclosed, wherein the lubricant-impregnated plate is divided into a pair of lubricant-impregnated halves with respect to the track rail. Moreover, the sintered resinous component for the lubricant-impregnated plate is produced by heating finely powdered synthetic resin of ultrahigh molecular weight polymers under pressure in a design mould.

In accordance with a further another aspect of the present invention, a linear motion guide unit is disclosed, wherein the track rail has the raceway grooves on lengthwise-extending, widthwise-opposing side surfaces thereof, and wherein the slider rides the track rail astride for sliding movement relatively to the track rail. As an alternative, the track rail is formed in an U-shape in cross-section, which includes widthwise opposing side-walls provided on lengthwise inward surfaces thereof with the first raceway grooves, and wherein the slider fits between the widthwise opposing side-walls for sliding movement with respect to the track rail.

With the linear motion guide unit of the present invention, the sintered resinous component is simply machined to tolerance of about ±0.025 and the lubricant-impregnated plate is mounted with the backing plate at any one of the opposite major surfaces thereof while mounted with the cartridge at another major surface. Thus, the lubricant-impregnated plate is certainly held in place with less possibility of deformation and distortion by virtue of the backing plate and the cartridge. That is to say, the backing plate and the cartridge, in combination, effectively keep the lubricant-impregnated plate against deformation and distortion to continue keeping the high accuracy of a clearance between the confronting lubricant-impregnated plate and the raceway groove.

As a result, the frictional resistance occurring between the slider and the track rail may be significantly reduced so that the slider is allowed to traverse smoothly along the track rail. The lubricant-impregnated plate applies continually lubricant to the raceway grooves, which are thus kept in well lubrication, while the problem of wear is eliminated whereby the lubricant-impregnated plate is kept from getting clogged at areas coming in contact with the raceway grooves. Moreover, the lubricating means of the present invention may be simply mounted on the forward and aft ends of the slider of the current linear motion guide unit incorporated in the machine bed and so on. Thus, the present invention contributes to improvement on the self-lubrication performance of the obsolete linear motion guide units.

Other aspect and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 17:
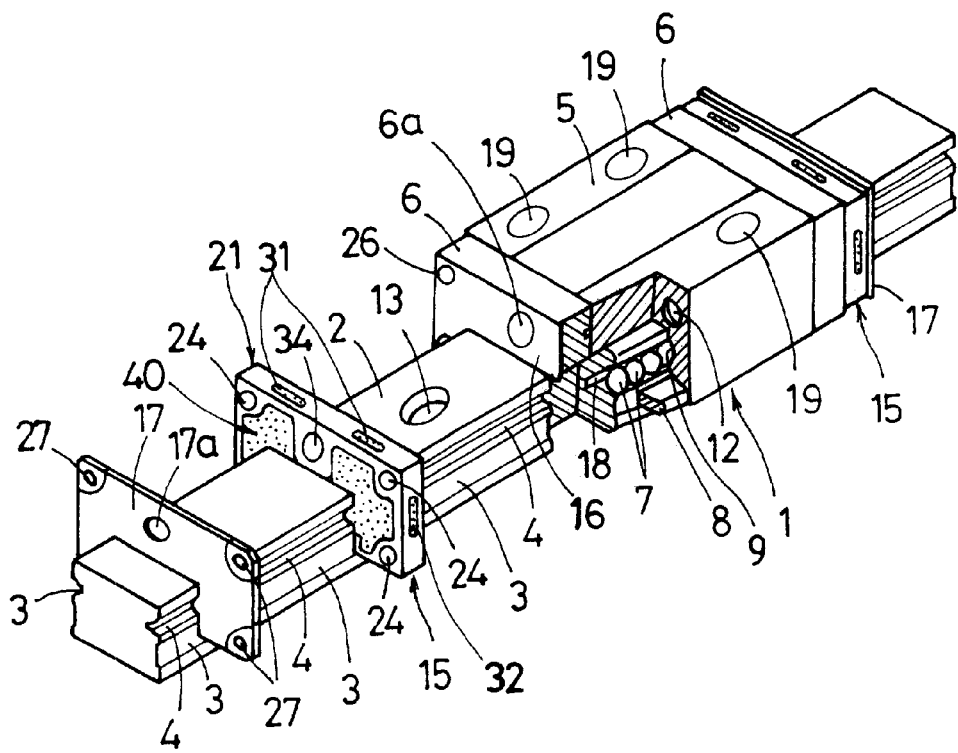
FIG. 17 is a perspective view, some partially broken away and others exploded, showing a linear motion guide unit of current art.
Figure 18:
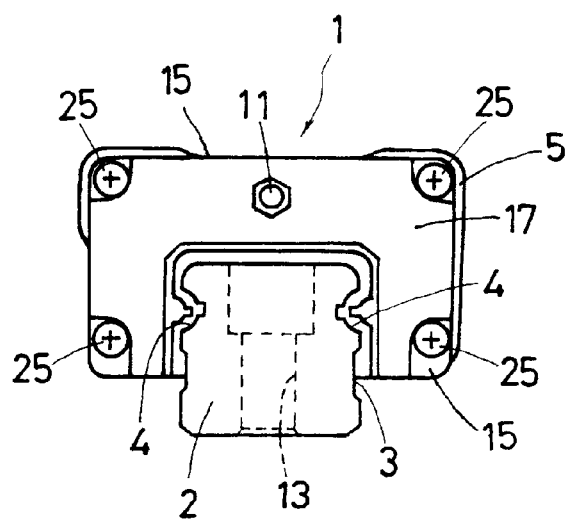
FIG. 18 is a front elevation of the prior linear motion guide unit shown in FIG. 17.
Figure 19:
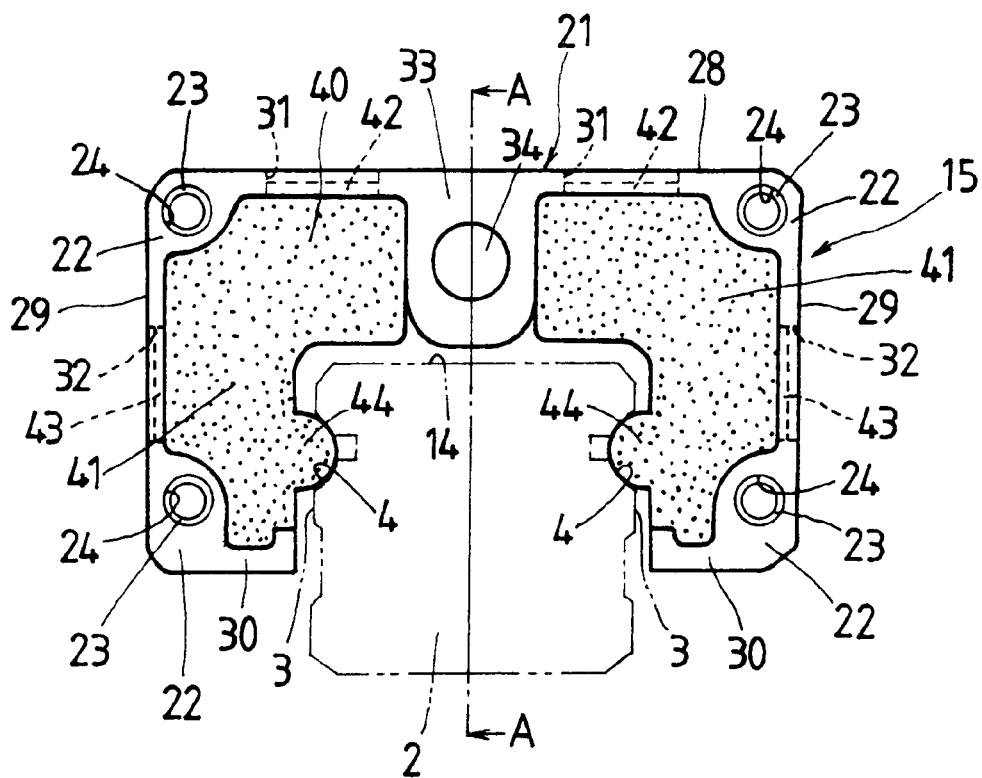
FIG. 19 is a front elevation illustrating a lubricant-impregnated plate incorporated in lubricating means used in the linear motion guide unit of FIG. 17.

Referring now in detail to the drawings, the linear motion guide unit according to the present invention will be explained below. In FIGS. 1 to 16 showing the preferred embodiments of the present invention, like parts and components compared with the prior linear motion guide unit in FIGS. 17 to 19 are given the same characters, so that the previous description will be applicable.

Figure 1:
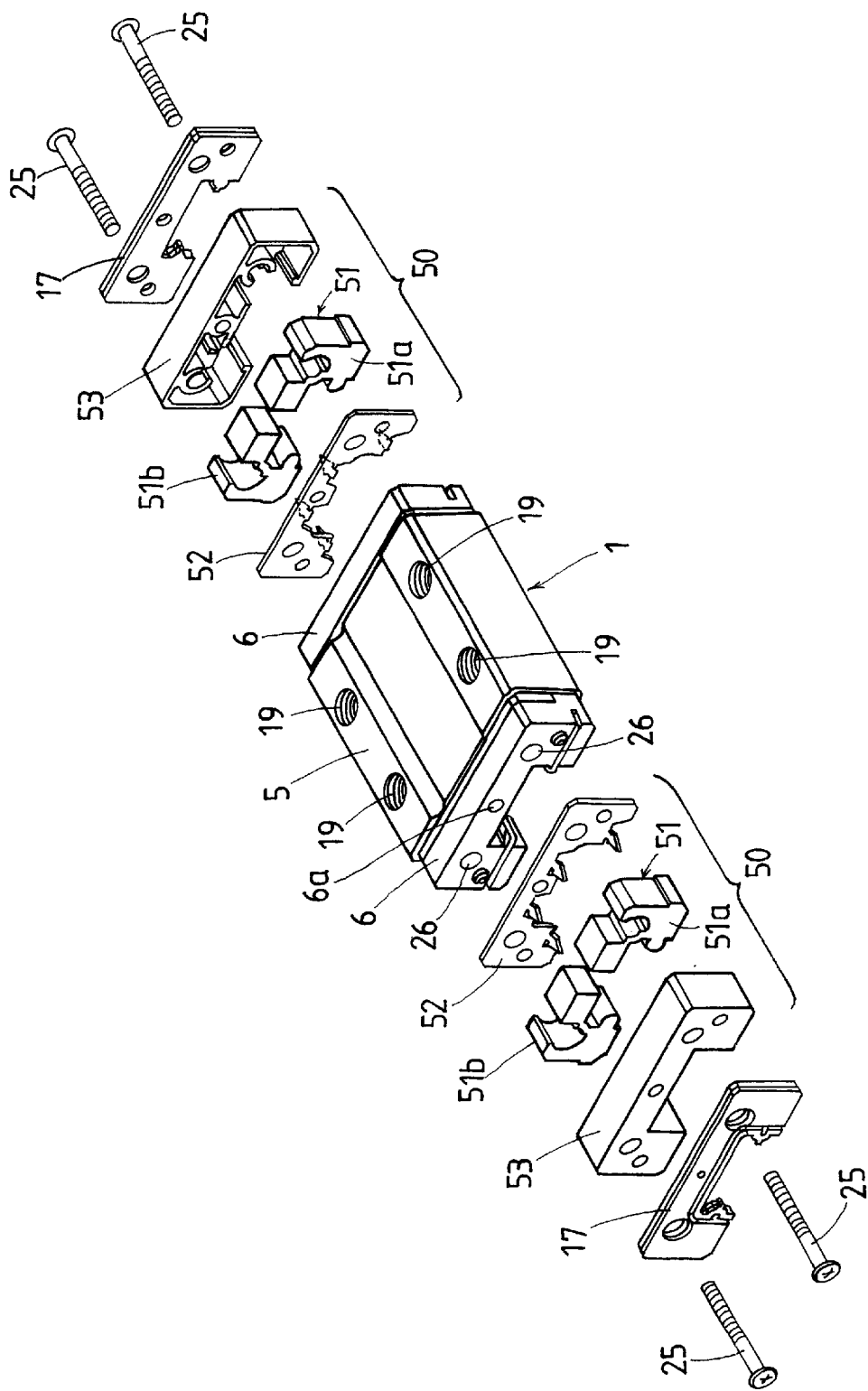
FIG. 1 is a perspective view, partially exploded, showing a preferred embodiment of a slider used in a linear motion guide unit according to the present invention.
Figure 2:
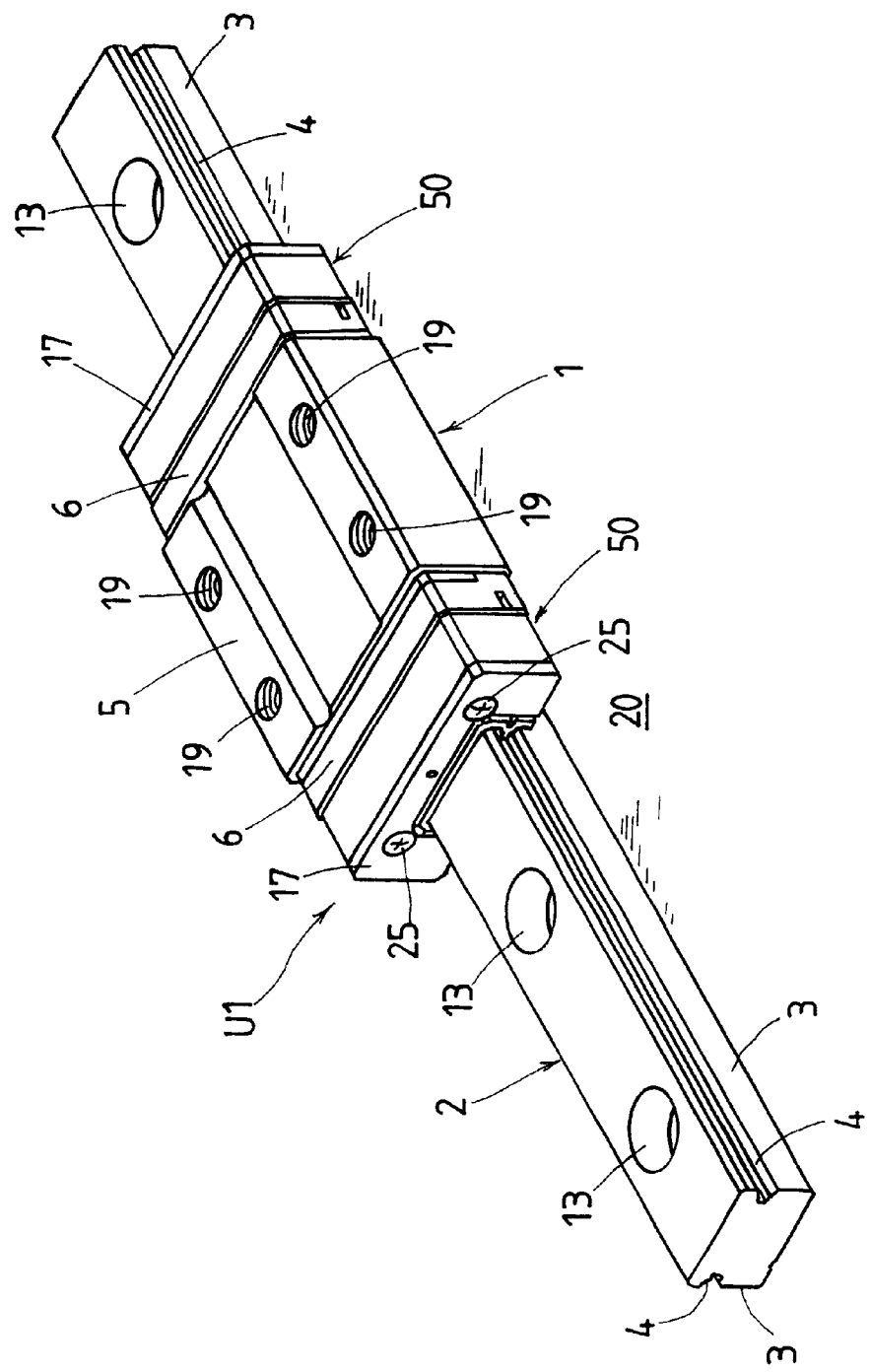
FIG. 2 is a perspective view showing a completed linear motion guide unit where the slider in FIG. 1 is combined with an elongated track rail.

Referring first to FIGS. 1 to 8 illustrating a first embodiment of a linear motion guide unit U1 according to the present invention, the linear motion guide unit U1 is suitable for small-sized machines operating under relatively small load. As apparent from FIG. 2, the linear motion guide unit U1 is mainly comprised of an elongated track rail 2 of substantially rectangular shape in cross section having lengthwise-extended raceway grooves 4, one on each side surface 3 of the track rail 2, and a slider 1 mounted astride the track rail 2 for sliding movement. The slider 1 includes a casing 5 made with raceway grooves confronting the raceway grooves 4, end caps 6 attached to forward and aft end faces of the casing 5, respectively, lubricating means 50 disposed in contact with end faces of the end caps 6, and end seals 17 arranged over end faces of the lubricating means 50. The lubricating means 50, as seen from FIG. 1, is sandwiched between the associated end cap 6 and end seal 17, clamped together with fastening bolts 25. The lubricating means 50 is composed of a pair of lubricant-impregnated halves 51, 51 disposed on widthwise opposite sides of the track rail 2, one to each side, a backing plate 52 arranged on a major surface of the lubricant-impregnated halves, which confronts the associated end cap 6, and a cartridge 53 for accommodating therein the lubricant-impregnated halves 51, 51. The lubricating means 50 is an assembled lubricator uniform in fore-and-aft thickness, which is formed in a recessed configuration conforming with the configured end of the casing 5 so as to ride the track rail 2 astride for sliding movement.

The lubricant-impregnated plate 51, as seen from FIG. 1, is divided into lubricant-impregnated halves 51a, 51b, which may separately come in sliding contact with the raceway grooves 4 on the lengthwise side surfaces 3 of the track rail 2. Each of the lubricant-impregnated halves 51a, 51b is allowed to provide only as much volume as needed to lubricate the raceway grooves 4 and, therefore, the lubricant-impregnated plate 51 may be made more compact in size. On assemblage of the lubricating means, the lubricant-impregnated halves 51a, 51b will be simply secured to the backing plate 52 into a composite plate by putting merely mass-produced lubricant-impregnated halves 51a, 51b of the same pattern in such a fashion as to invert any one to the other. Then, the composite plate is accommodated in the cartridge 53. Moreover, the backing plate 52 and the cartridge 53 are formed in symmetry on widthwise opposite sides with respect to their common center. These make it possible to use any mould of the same pattern to produce the lubricant-impregnated halves 51a, 51b, resulting in the reduction in manufacturing cost of the lubricating means 50.

Figure 3:
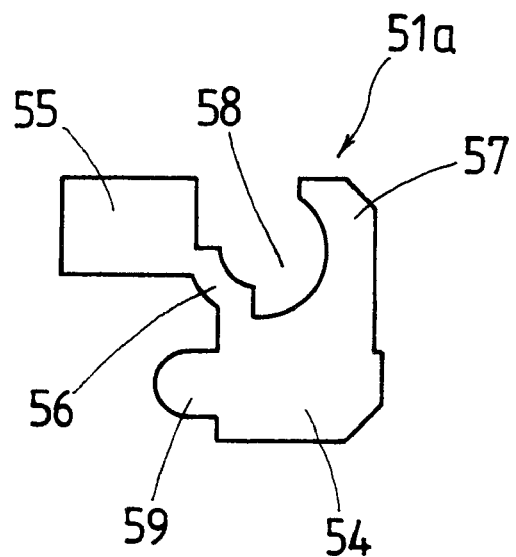
FIG. 3 is a front elevation of any one of lubricant-impregnated halves constituting a lubricant-impregnated plate shown in FIG. 1.
Figure 4:
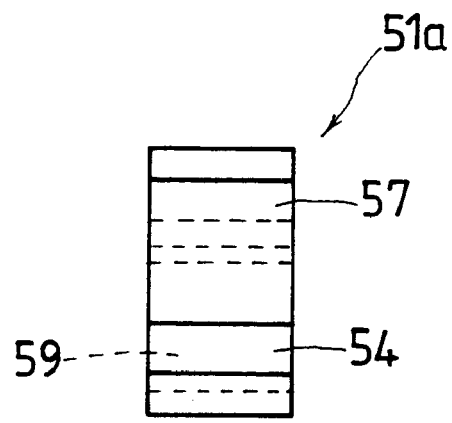
FIG. 4 is a side elevation of any one of the lubricant-impregnated halves in FIG. 3.

As shown in FIGS. 3 and 4, the lubricant-impregnated half 51a has major portions 54, 55 connected with one another through a narrow bridge 56, and a protrusion 57 extending upwards from the major portion 54. The major portion 54, bridge portion 56 and protrusion 57, in combination, define a cove 58 in which a bolt 25 fits to fasten the lubricating means 50. The major portion 54 is also made with a raised portion 59 having a convex surface, which comes in sliding contact with the associated raceway groove 4 on the track rail 2 to apply lubricant over the raceway groove 4. Lubricant contained in the major portions 54, 55 is applied to the associated raceway groove 4 through the raised portion 59. The lubricant-impregnated halves 51a, 51b are made of sintered resinous component of porous structure, which is produced by heating finely powdered synthetic resin of ultrahigh molecular weight polymers and so on under pressure in a mould of preselected design. Open voids of cells in porous structure of the sintered resinous component are filled with oily lubricant.

As the sintered resinous component can be easily machined with high precision, the lubricant-impregnated plate 51 may be formed to a tolerance as strict as possible of substantially zero with respect to the raceway grooves 4 on the track rail 2. As an alternative, the lubricant-impregnated plate 51 may be made to provide a negative allowance of interference, by which the lubricant-impregnated plate 51 is allowed to fit under a somewhat pre-stressed condition. The lubricant-impregnated halves 51a, 51b are kept in contact with the raceway grooves 4 on the track rail 2, to continually apply the lubricant, which are held in the lubricant-impregnated halves 51a, 51b, over the raceway grooves 4. This makes it possible to render the linear motion guide unit U1 maintenance-free in regard to lubrication. Resinous component produced by firing powdery ultrahigh molecular weight polyethylene resin in a mould, moreover, has an intrinsic mechanical property that it is less subject to wear even after repeated sliding motions. Thus, the lubricant-impregnated halves 51a, 51b are kept from getting clogged with debris or cuttings. The lubricant-impregnated halves 51a, 51b short of lubricant after consumption of the lubricant may be replenished with fresh lubricant. This ensures the long-lasting service life of the lubricating means 50.

Figure 5:
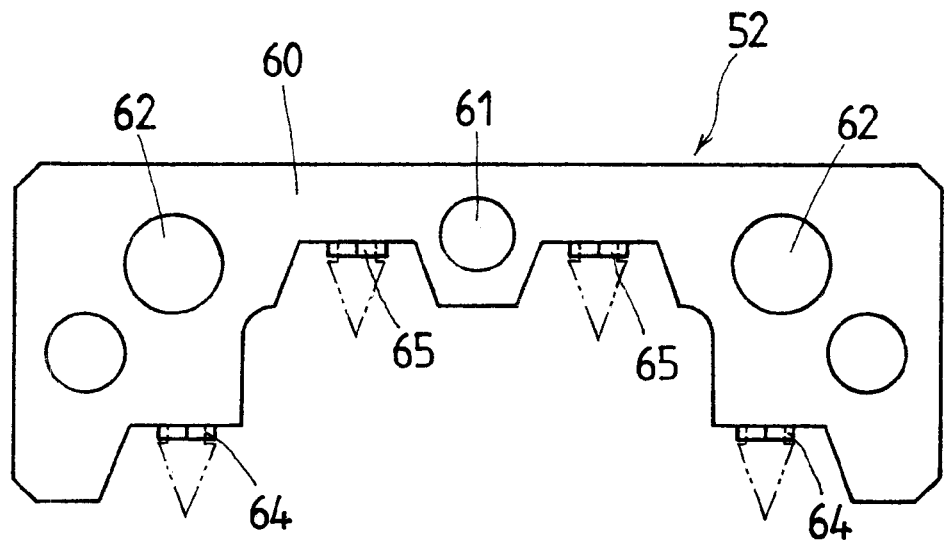
FIG. 5 is a front elevation of a backing plate shown in FIG. 1.
Figure 6:
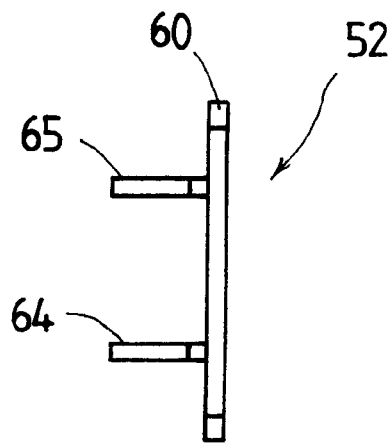
FIG. 6 is a side elevation showing the backing plate in FIG. 5.

Referring next to FIGS. 5 and 6, the backing plate 52 in the lubricating means 50 is made of a single metallic plate 60 mounted spanning both the lubricant-impregnated halves 51a, 51b. The metallic plate 60 is made at the center thereof with an opening 61 serving to connect the slider 1 to lubricant-supply means such as a grease nipple, and further is provided with a pair of bolt holes 62, 62 widthwise opposing with respect to the central opening 61. The lubricating means 50 is fastened to the slider 1 with bolts 25, 25 extending through the holes 62, 62. The metallic plate 60, moreover, has pointed projections or hooks at areas confronting the major portions 54, 55 of the lubricant-impregnated halves 51a, 51b. The pointed projections or hooks are bent to such a specific angle as to provide claws 64, 65 that are easily piercable into the sintered resinous component to adhere the backing plate 52 to the lubricant-impregnated halves 51a, 51b. Thus, backing plate 52 may be effectively fastened to the lubricant-impregnated halves 51a, 51b by simply piercing them with the claws 64, 65, either before or after the lubricant is impregnated into the sintered resinous components.

In accordance with the composite plate in which the lubricant-impregnated halves 51a, 51b are secured on the backing plate 52 high in stiffness, the backing plate 52 may well keep the lubricant-impregnated halves 51a, 51b against deformation even under the working condition where the lubricant-impregnated halves 51a, 51b experience the external force that might otherwise causes such deformation. Thus, the backing plate 52 helps ensure the precise geometry and configuration of the surface areas of the lubricant-impregnated halves 51a, 51b, which come in sliding contact with the raceway grooves 4. As a result, the lubricant-impregnated halves 51a, 51b are not urged excessively against the raceway grooves 4, nor are they spaced apart largely away from the raceway grooves 4. This makes it possible to incessantly apply the sufficient lubricant to the raceway grooves 4 with no increase of the sliding resistance to the raceway grooves 4.

Figure 7:
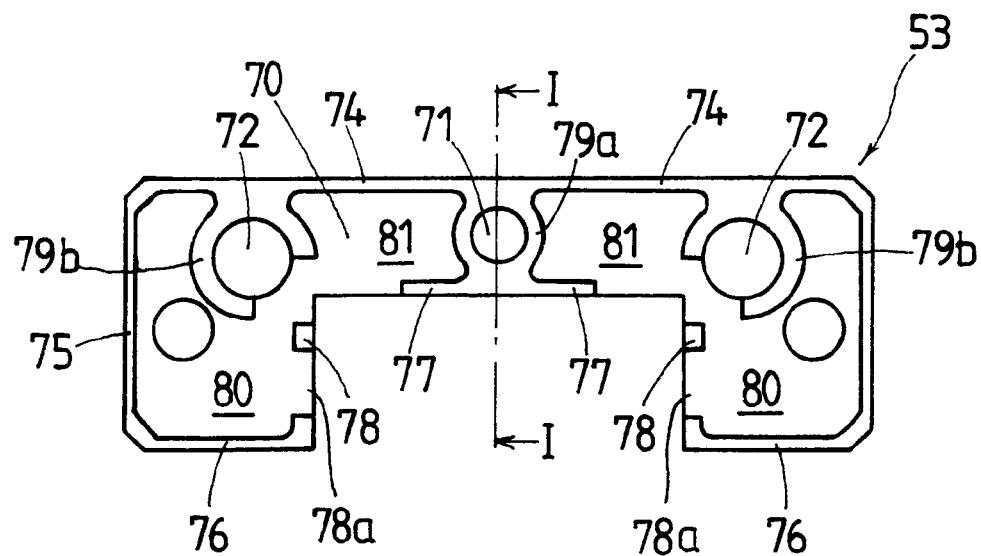
FIG. 7 is a rear elevation of a cartridge for accommodating the lubricant-impregnated plate of FIG. 1 therein.
Figure 8:
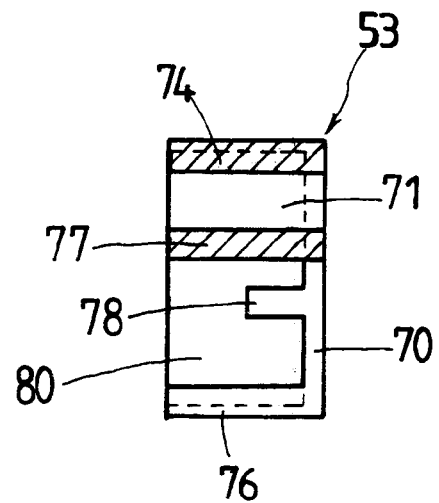
FIG. 8 is a traverse cross section of the cartridge taken along the line I—I of FIG. 7.
Figure 9:
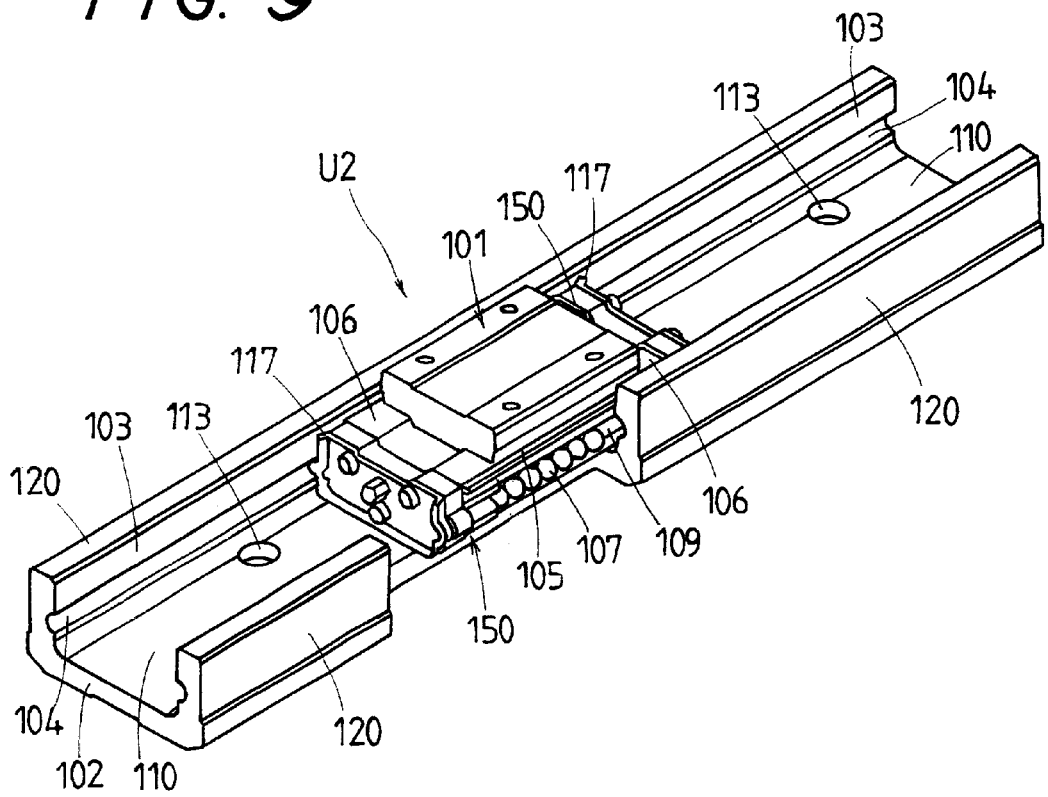
FIG. 9 is a perspective view, partially broken away, showing another embodiment of the linear motion guide unit according to the present invention.

As shown in FIGS. 7 and 8, the lubricant-impregnated halves 51a, 51b are contained in the cartridge 53, which is made of any one of metals, synthetic resins, synthetic rubbers, and so on, and formed with widthwise opposing sleeves so as to ride the track rail 2 astride, as with the casing 5 of the slider 1. The cartridge 53 has a major front wall 70 to shield over front faces of the lubricant-impregnated halves 51a, 51b. The major front wall 70 is bored with a central opening 71 and widthwise opposing holes 72, which are, respectively, located in alignment with the central opening 61 and the widthwise holes 62 in the backing plate 52.

The cartridge 53 includes a ceiling wall 74, widthwise opposing side walls 75, 75 and floor walls 76, 76, which are integral with the major front wall 70 and continuous with one another to provide a peripheral wall to cover allover uppers, sides and bottoms of the lubricant-impregnated halves 51a, 51b. The cartridge 53 is further provided with inward wall sections made integrally with the major front wall 70, which consist of inward floor walls 77, 77 extending to hold in place thereon the major portions 55 of the lubricant-impregnated halves 51a, 51b, and retainer portions 78, 78 spacing away above the floor walls 76, 76 and extending from the major front wall 70 up to a height midway the fore-and-aft thickness of the cartridge. Windows 78a, 78a are left between the floor walls 76, 76 and the retainer portions 78, 78, through which the raised portions 59 of the lubricant-impregnated halves 51a, 51b are allowed to project outwardly to the track rail 2. The cartridge 53 also has cylindrical collars 79a, 79b that are formed integrally with the major front wall 70 in alignment with the central opening 71 and the widthwise opposing holes 72, respectively. The collars 79a, 79b, when tightened together with the grease nipple and fastening bolts inserted there, come in abutment against the backing plate 52 to let the backing plate 52 assume entirely squeezing or clamping stress. The major portions 54, 55 of the lubricant-impregnated halves 51a, 51b are spaced apart from each other and accommodated in compartments 80, 81 each defined by the associated peripheral wall, inward wall section and collars, while the raised portions 59 of the lubricant-impregnated halves 51a, 51b protrude out of the windows 78a to come to make sliding contact with the raceway grooves 4.

The fastening bolts 25, after having extended through the end seal 17, the holes 72 in the cartridge 53, coves 58 in the lubricant-impregnated plate 51 and the holes 62 in the backing plate 52, from one to another, are screwed into the threaded holes in the casing 5. The squeezing force due to the fastening bolts 25, since transmitted to both the backing plate 52 and the end cap 6 through the collars 79b in the cartridge 53, exerts no substantial action on the lubricant-impregnated halves 51a, 51b. This makes it possible to protect the lubricant-impregnated halves 51a, 51b against the deformation or distortion that might otherwise happen at their raised portions 59 owing to the compressive force when the bolts 25 has been tightened, thus helping ensure that the raised portions 59 make smooth sliding movement with keeping constant contact with the raceway grooves 4.

On assembly of the lubricating means 50 described earlier, the lubricant-impregnated halves 51a, 51b are set individually on the track rail 2 into the complete lubricant-impregnated plate 51, to which the backing plate 52 is then secured to provide the composite plate. Further the cartridge 53 encloses therein the composite plate thereby finishing the lubricating means 50, which is finally fastened to the casing 5 to keep precise geometry with respect to the track rail 2. The cartridge 53, as surrounding around the lubricant-impregnated plate 51, serves not only to help keep the lubricant-impregnated plate 51 in place with stability, but also to preserve the lubricant-impregnated plate 51 from contamination by cuttings, dust and dirt, breakage and escape of lubricant. According to the construction stated just above, moreover, the cartridge 53 is formed in a single part receiving therein both the lubricant-impregnated halves 51a, 51b. This construction results in making handling of the lubricant-impregnated plate 51 much easier.

Referring now to FIGS. 9 to 16, there is shown another embodiment of the linear motion guide unit of the present invention. The linear motion guide unit U2 in FIGS. 9 to 16, as opposed to the linear motion guide unit U1 shown earlier in FIGS. 1 to 8, is the type well available for the large-sized machine sustainable heavy load, and has an elongated track rail 102 formed in an U-shape in cross-section, which includes widthwise opposing side-walls 120 made on lengthwise inward surfaces 103 thereof with raceway grooves 104. It is to be noted that this embodiment is substantially identical in basic construction of the sliding mechanism with the first embodiment explained earlier, with the exception of the modified lubricating means 150.

The track rail 102 has inwardly a guide channel 110 in which a slider 101 fits for lengthwise sliding movement. The track rail 102 is secured to any machine bed with fasten-down bolts that fit in holes 113. The slider 101 has a casing 105 mounted on forward and aft ends thereof with end caps 106, one to each end, which are further mounted thereon with end seals 117.

Figure 10:
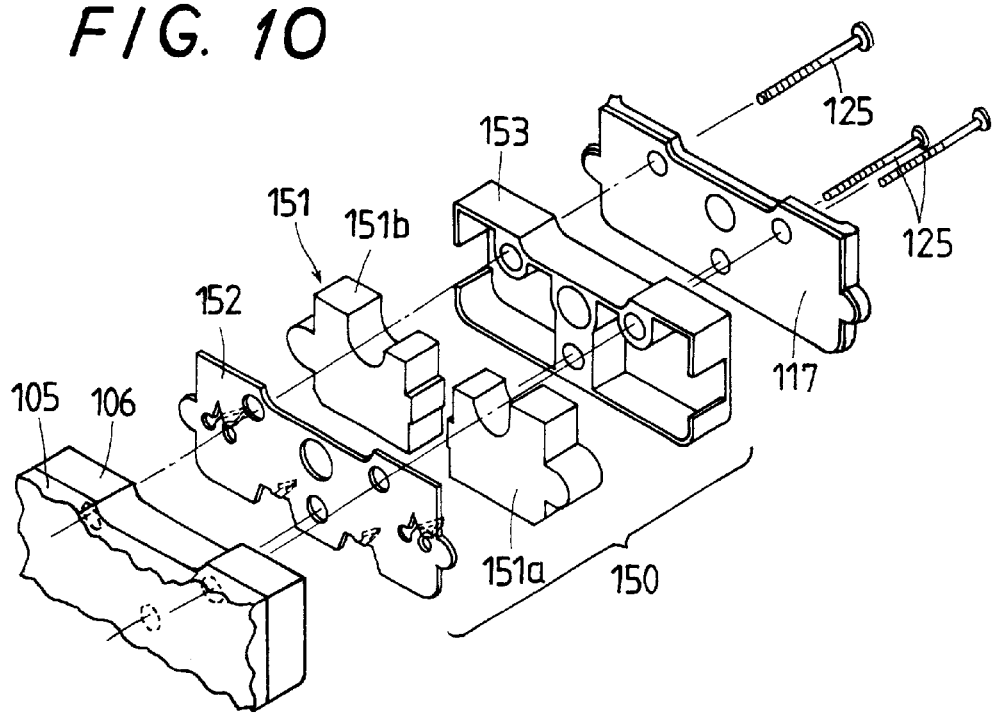
FIG. 10 is an exploded perspective view illustrating a lubricant-impregnated plate incorporated in the lubricating means in FIG. 9.

As illustrated in detail in FIG. 10, a lubricant-impregnated plate 105 is divided equally into two pieces of lubricant-impregnated halves 151a, 151b, each of which is arranged individually so as to make sliding contact with any associated raceway groove 104 on the lengthwise inward surface 103 of the track rail 102. A composite plate in this embodiment is also prepared by fixing merely mass-produced lubricant-impregnated halves 151a, 151b of the same pattern on a backing plate 152 in such a fashion as to invert any one to the other. Then, the composite plate is assembled together with a cartridge 153 into the lubricating means 150 in such a manner that the lubricant-impregnated plate 151 is contained in the cartridge 153 lidded with the backing plate 152. It will be noted that both the backing plate 152 and the cartridge 153 are formed in symmetry with respect to their common widthwise centerline.

Figure 11:
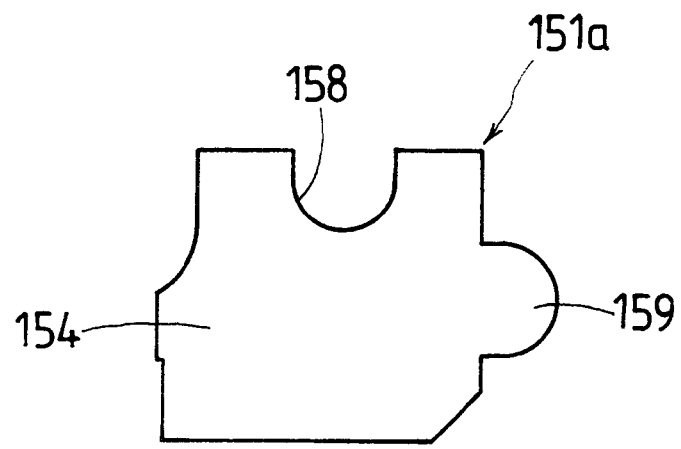
FIG. 11 is a front elevation of any one of lubricant-impregnated halves constituting a lubricant-impregnated plate shown in FIG. 9.
Figure 12:
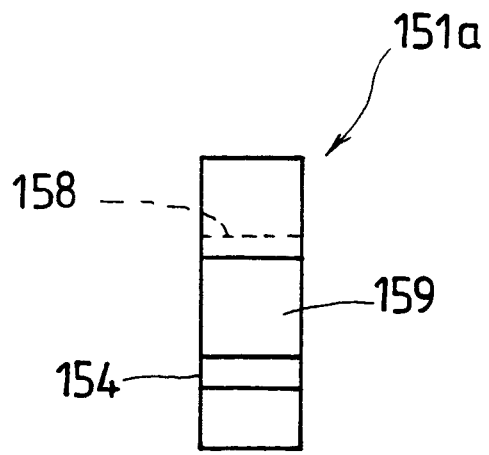
FIG. 12 is a side elevation of the lubricant-impregnated half in FIG. 11.

As seen from FIGS. 11 and 12, the lubricant-impregnated half 151a has a major portion 154 that is made at the upper area thereof with an upward opened recess 158 for a fastening bolt 125. The major portion 154 is also made with a raised portion 159 having a convex surface, which comes in sliding contact with the associated raceway groove 104 of the track rail 102 to apply lubricant over the raceway groove 104. Lubricant contained in the major portion 154 is applied to the associated raceway groove 104 through the raised portion 159. Materials and production process of sintered resinous component for the lubricant-impregnated halves 151a, 151b are the same as that of the lubricant-impregnated halves 51a, 51b described earlier. Mechanical functions of the lubricant-impregnated plate 151; sliding engagement of the lubricant-impregnated plate 151 with the raceway grooves 104 on the track rail 102, lubricant supply to the raceway grooves 104, protection against getting clogged by cuttings, and so on are the same as described earlier for the lubricant-impregnated plate 51 in the first embodiment.

Figure 13:
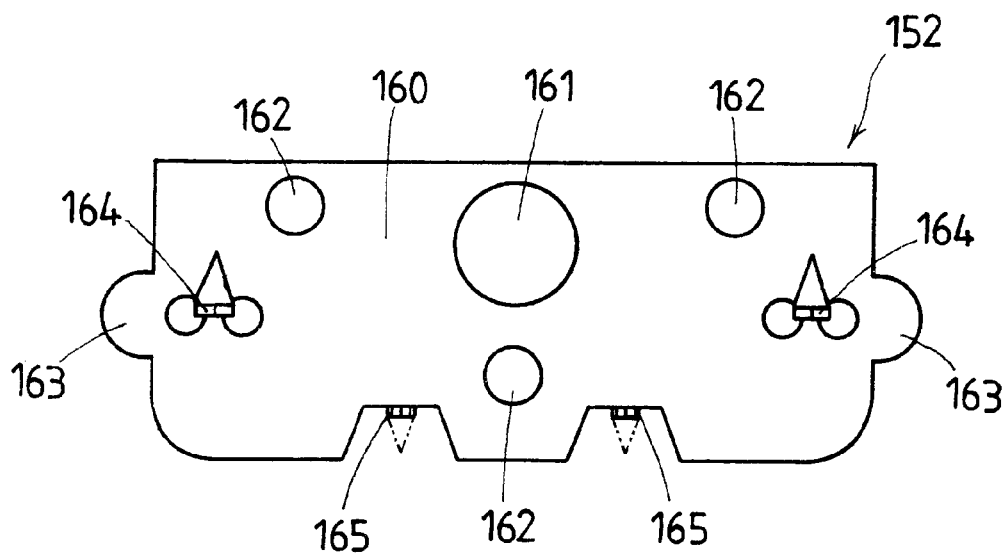
FIG. 13 is a front elevation of a backing plate shown in FIG. 10.
Figure 14:
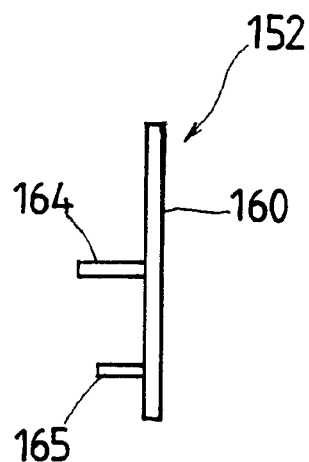
FIG. 14 is a side elevation of the backing plate in FIG. 13.

Next, FIGS. 13 and 14 illustrate the backing plate 152 for the lubricating means 150, which is made of a sheet of metallic plate 160 spanning both the lubricant-impregnated halves 151a, 151b. The metallic plate 160 is made at the center thereof with an opening 61 serving to connect the slider 101 to lubricant-supply means such as a grease nipple, and further is provided with three bolt holes 162 arranged spaced apart widthwise from each other, where fastening bolts 162 fit in to connect the lubricating means 150 to the slider 101. The backing plate 152 is made at widthwise opposing edges with convex portions 163, which are configured so as to conform to the raised portions 159 of the lubricant-impregnated halves 151a, 151b, thereby supporting or reinforcing the raised portions 159.

The metallic plate 160 has pointed projections or hooks at areas confronting the major portions 154, 154 of the lubricant-impregnated halves 151a, 151b. The pointed projections or hooks are bent to such a specific angle as to provide claws 164, 165 that are easily piercable into the sintered resinous component to adhere the backing plate 152 to the lubricant-impregnated halves 151a, 151b. Thus, backing plate 152 may be effectively fastened to the lubricant-impregnated halves 151a, 151b by simply piercing them with the claws 164, 165. The backing plate 152 well helps protect the lubricant-impregnated halves 151a, 151b against deformation or distortion at their raised portions 159, keeping precise sliding relation of the raised portions 159 with the raceway grooves 104, thus reducing the friction encountered when the raised portions 159 slide along the raceway grooves 104. Like many functions the lubricating means 50 stated earlier has accomplished, the lubricating means 150 also ensures well lubrication of the raceway grooves 104.

Figure 15:
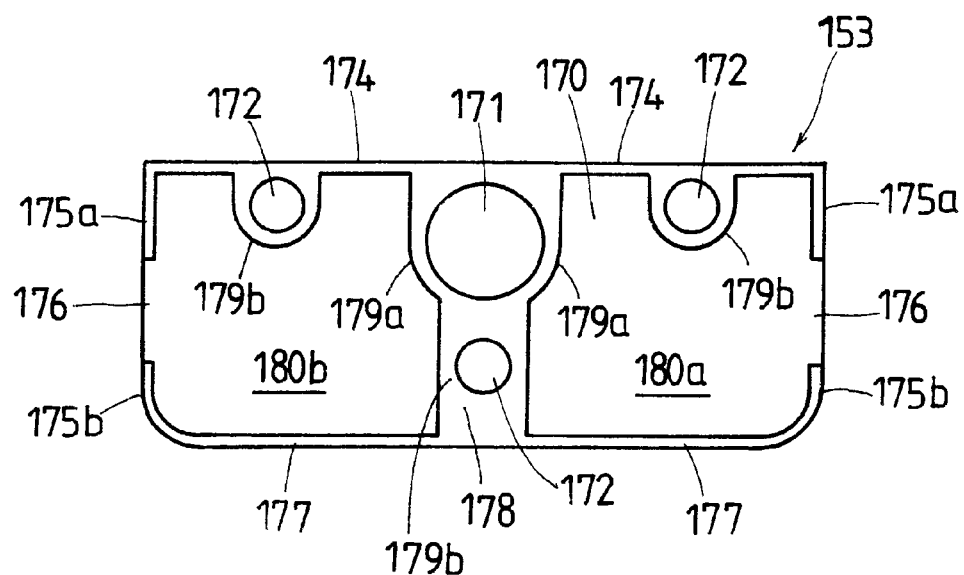
FIG. 15 is a rear elevation of a cartridge for receiving the lubricant-impregnated plate of FIG. 10 therein.
Figure 16:
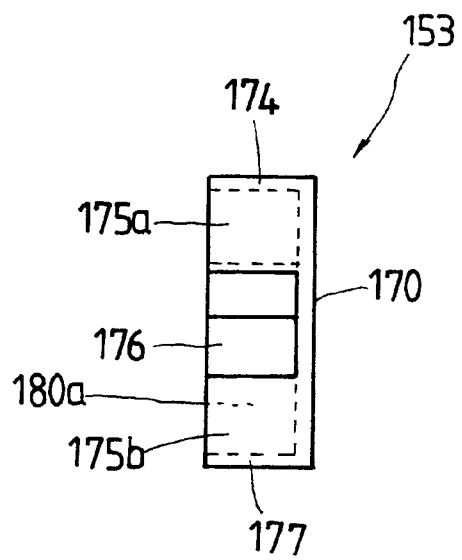
FIG. 16 is a side elevation illustrating the cartridge of FIG. 15.

The lubricant-impregnated plate 151 is contained in a cartridge 153 shown in FIGS. 15 and 16, which is made of any one of metals, synthetic resins, synthetic rubbers and so on and formed in a configuration that is accommodated, as with the casing 105 of the slider 101, in the guide channel 110 of U-shape in the track rail 2. The cartridge 153 has a major front wall 170 to shield over front faces of the lubricant-impregnated halves 151a, 151b. The major front wall 170 is bored with a central opening 171 for the grease nipple and other three holes 172 for the fastening bolts 125, which are, respectively, located in alignment with the central opening 161 and the holes 162 in the backing plate 152.

The cartridge 153 has a peripheral wall integral with the major front wall 170 to cover uppers, sides and bottoms of the lubricant-impregnated halves 151a, 151b. The peripheral wall is composed of a ceiling wall 174, widthwise opposing side walls 175a turning downward at the widthwise opposing ends of the ceiling wall 174, a floor wall 176 and other side walls 175b turning upward at the widthwise opposing ends of the floor wall 176. The cartridge 153 has an inside partition 178 integral with the major front wall 170 while surrounding around the central opening 171, thereby defining in place the widthwise inward edges of the major portions 154, 154 of the lubricant-impregnated halves 151a, 151b when accommodated in the cartridge 153. The inside partition 178 consists of a larger collar 179a around the central opening 171 for the grease nipple and a lesser collar 179b around the central hole 172 for the fastening bolt. Left between the confronting side walls 175a and 175b are windows 176 where the raised portions 159 of the lubricant-impregnated halves 151a, 151b is allowed to protrude outwardly.

Moreover, the cartridge 153 is provided therein with other collars 179b formed integrally with the major front wall 170 to surround around other bolt holes 172, 172 spaced apart widthwise from each other. The collars 179a, 179b, when tightened together with the grease nipple and fastening bolts inserted there, come in abutment against the backing plate 152 to let the backing plate 152 assume entirely squeezing or clamping stress. The major portions 154 of the lubricant-impregnated halves 151a, 151b are spaced apart from each other and accommodated in compartments 180, 181 each defined by the associated peripheral wall, inside partition and collars 179a, 179b, while the raised portions 159 of the lubricant-impregnated halves 151a, 151b protrude out of the windows 176 to come to make sliding contact with the raceway grooves 104.

The fastening bolts 125, after having passed through the end seal 117, the holes 172 in the cartridge 153, the recess 158 in the lubricant-impregnated plate 151 and the bolt holes 162 in the backing plate 152, from one to another, are ultimately screwed into the threaded holes in the casing 105. The squeezing force due to the fastening bolts 125, since transmitted to both the backing plate 152 and the end cap 106 through, especially, the collars 179b in the cartridge 153, exerts no substantial action on the lubricant-impregnated halves 151a, 151b. This makes it possible to keep the lubricant-impregnated halves 151a, 151b against the deformation or distortion that might otherwise occur in their raised portions 159 owing to the compressive force when the bolts 125 has been tightened, thus helping ensure that the raised portions 159 make smooth sliding movement with keeping steady contact with the raceway grooves 104.

The lubricating means 150 in the second embodiment is substantially identical in its assembly and mounting to the casing 105 with the lubricating means 50 stated earlier. Functions realized by the cartridge 53 in the first embodiment stated earlier; precise mounting, protection against getting contaminated by debris, prevention against breakage and escape of lubricant, and easy handling of the lubricant-impregnated plate 151 are equally applicable to the cartridge 153 in the second embodiment.

Obviously many modifications and variations of the lubricant-impregnated plate 51, 151 are possible in light of the above teachings; the sintered resinous component for the lubricant-impregnated plate 51, 151 described above may be designed such that, for example, the raised portions 59, 159 coming in sliding contact with the raceway grooves 4, 104 of the track rail 2, 102 are made rich in porosity, whereas the residual portions are made less in porosity. The portions rich in porosity are highly susceptible of absorbing lubricating oil to admit the positive flow of lubricating oil into the highly porous portions themselves. The sintered resinous component having two parts different in porosity from each other may be fabricated, for example, by using any kind of powdery resinous materials differing in grain size, or by regulating the sintering temperature. Moreover, it will be also obvious to those skilled in the art to provide a lubricant reservoir to the cartridge to continue supplying lubricant to the lubricant-impregnated plate 51, 151 in order to prolong the service life with no replenishment of the lubricant. In addition, the lubricant-impregnated plate 51, 151 may be made of a unitary plate in return for the divided two halves arranged in opposite sides of the track rail 2, 102.

What is claimed is:

1. A linear motion guide unit comprising;

a track rail provided lengthwise with first raceway grooves and a slider movable with respect to the track rail;

the slider being composed of a casing made with second raceway grooves confronting the first raceway grooves and return passages, rolling elements running through load areas formed between the confronting first and second raceway grooves, end caps fastened to end faces of the casing, one to each end face, and provided therein with turnarounds connecting the load areas and the return passages to form recirculating passages where the rolling elements are allowed to run through in an endless manner, lubricating means arranged ion end faces of the end caps, one to each end cap, to lubricate the first raceway grooves formed on the track rail, and end seals disposed over the lubricating means;

wherein the lubricating means is comprised of a lubricant-impregnated plate made of a sintered resinous component of porous structure impregnated with lubricant, a backing plate attached to any one of opposing major surfaces of the lubricant-impregnated plate to support the lubricant-impregnated plate, and a cartridge formed as unit having a recess fully enclosing another exposed major surface and a periphery of the lubricant-impregnated plate thereby accommodating the lubricant-impregnated plate in the recess, wherein the lubricant-impregnated plate held in the recess with the backing plate and the cartridge on forward and aft major surfaces thereof is protected from deformation due to any external force, making certain of smooth sliding-contact of the lubricant-impregnated plate with the raceway grooves on the track rail to help reduce sliding resistance.

2. A linear motion guide unit constructed as defined in claim 1, wherein the lubricant-impregnated plate includes a major portion contained in the cartridge to store the lubricant therein, and a minor portion formed integrally with the major portion and allowed to come in sliding contact with any associated raceway groove formed on the track rail to apply the lubricant stored in the major portion onto the associated raceway groove, and wherein the cartridge is provided therein with a window to allow the minor portion to protrude out of the cartridge.

3. A linear motion guide unit as defined in claim 1, wherein the lubricating means is disposed between the end seal and the end cap, and fastened to the casing together with the end seal and end cap by means of bolts, and wherein fastening stress caused when the bolt is tightened is sustained by both the backing plate and the cartridge so that the lubricant-impregnated plate is relieved of the fastening stress.

4. A linear motion guide unit constructed as defined in claim 3, wherein the cartridge is provided with a collar in which the bolt fits for fastening, and wherein the collar comes in abutment against the backing plate at an area where the bolt extends for fastening, thereby transmitting the fastening stress to the backing plate.

5. A linear motion guide unit constructed as defined in claim 1, wherein the backing plate is provided with a piercing claw, and wherein the lubricant-impregnated plate is mounted to the backing plate by piercing the lubricant-impregnated plate with the claw.

6. A linear motion guide unit constructed as defined in claim 1, wherein the lubricant-impregnated plate is divided into a pair of lubricant-impregnated halves with respect to the track rail.

7. A linear motion guide unit constructed as defined in claim 1, wherein the sintered resinous component for the lubricant-impregnated plate is produced by heating finely powdered synthetic resin of ultrahigh molecular weight polymers under pressure in a design mould.

8. A linear motion guide unit constructed as defined in claim 1, wherein the track rail is made of an elongated member of rectangle in cross-section, which has the raceway grooves on lengthwise-extending, widthwise-opposing side surfaces thereof, and wherein the slider rides the track rail astride for sliding movement relatively to the track rail.

* * * * *